Jan. 17, 1961

D. TANN 2,968,502

SECURED STUD AND METHOD OF ATTACHING

Filed June 10, 1957

INVENTOR.
David Tann
BY
Harness, Dickey & Pierce
ATTORNEYS.

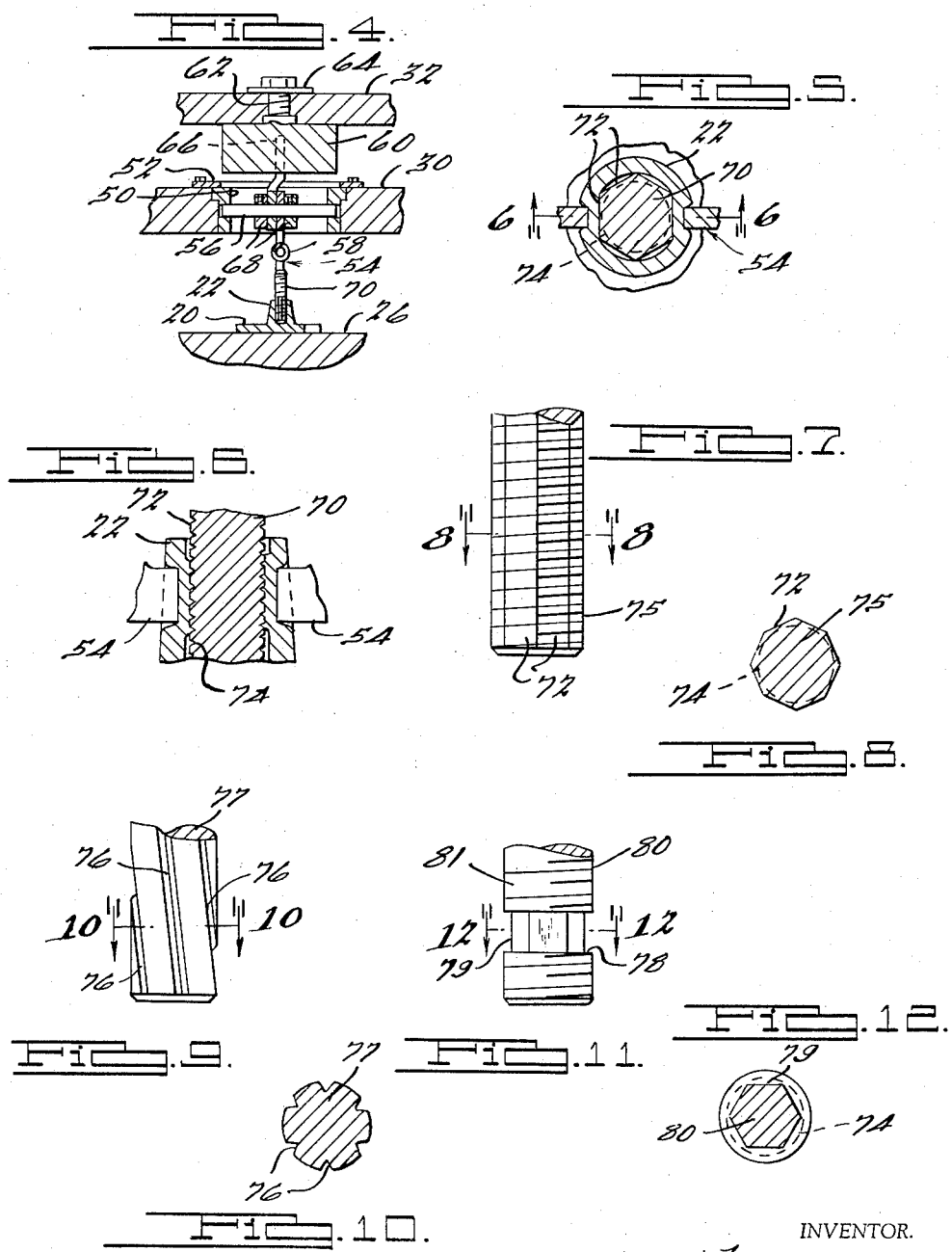

United States Patent Office
2,968,502
Patented Jan. 17, 1961

2,968,502

SECURED STUD AND METHOD OF ATTACHING

David Tann, 333 Covington Drive, Detroit, Mich.

Filed June 10, 1957, Ser. No. 664,637

3 Claims. (Cl. 287—20)

This invention relates to crimping devices for securing threaded studs to articles, and particularly to a crimping device which forces the metal of a hollow boss about a threaded stud disposed therein in a manner to resist rotation and removal.

In the past, threaded studs have been attached to ornamental articles such as, for example, medallions and die cast or stamped metal letters by screwing the stud into an aperture in an article or in a boss thereon. This required a drive element for the stud which rotated the stud as it was advanced into the aperture.

The present invention embodies a threaded stud having suitable flats or other configurations adjacent one end which is dropped into the aperture in the boss and secured thereto against rotation and axial movement by crimping the wall of the boss. Suitable apparatus is provided for performing the crimping operation which is herein illustrated by way of example as tongs pivotally supported on a first member which is movable to position the tongs adjacent to the boss after which a second member applies a crimping pressure to the tongs to crimp the boss and secure the stud therein.

It is one object of the invention to secure a threaded stud in an article in a simple relatively inexpensive manner.

It is another object of the invention to retain a threaded stud secured to an article by crimping metal into the thread and grooves in the stud surface.

It is a further object of the invention to provide threaded studs adapted to be rigidly secured to ornamental articles.

Other objects and features of novelty of the present invention will be specifically pointed out or will otherwise become apparent when referring, for a better understanding of the invention, to the following description taken in conjunction with the accompanying drawings, wherein:

Fig. 4 is a sectional view of the structure illustrated in Fig. 1, taken along the line 4—4 thereof;

Fig. 5 is an enlarged sectional view of the structure illustrated in Fig. 1, taken along the line 5—5 thereof;

Fig. 6 is an enlarged sectional view of the structure illustrated in Fig. 5, taken along the line 6—6 thereof;

Fig. 7 is an elevational view of a threaded stud embodying features of the present invention;

Fig. 8 is a sectional view of the threaded stud illustrated in Fig. 7, taken along the line 8—8 thereof;

Fig. 9 is an elevational view of a second threaded stud embodying features of the present invention;

Fig. 10 is a sectional view of the threaded stud illustrated in Fig. 9, taken along the line 10—10 thereof;

Fig. 11 is an elevational view of a third threaded stud embodying features of the present invention; and Fig. 12 is a sectional view of the threaded stud illustrated in Fig. 11, taken along the line 12—12 thereof.

Figure 1:
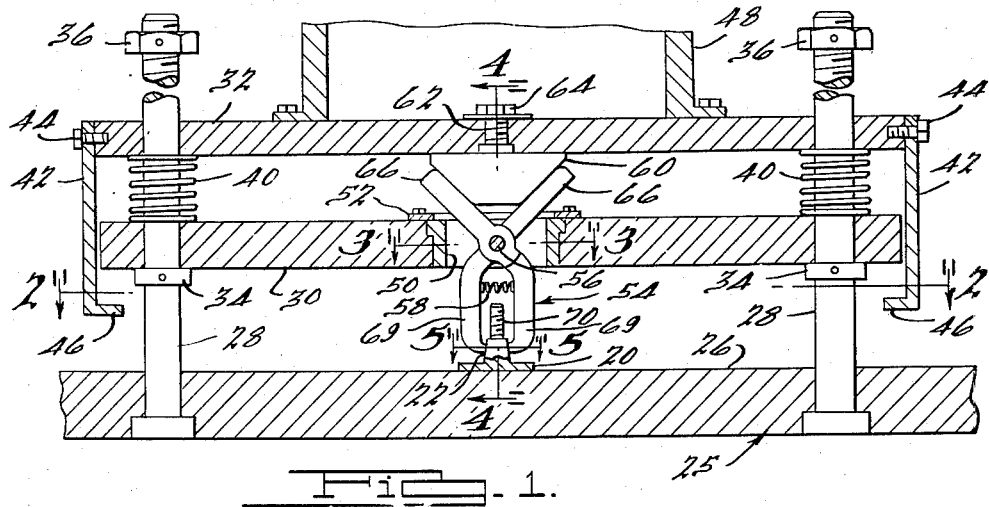
Figure 1 is a sectional view of a crimping device embodying features of the invention.

Referring to Figs. 1 through 4, an ornamental article 20, in this case a die cast metal letter M having a boss 22 secured thereto with an aperture 24 therein, is illustrated in position upon a base 26 of a crimping press 25. Four cylindrical columns 28 extend perpendicularly from the base 26 and have members 30 and 32 slidably disposed thereon. The movement of the member 30 is restricted in one direction by adjustable stop collars 34 mounted on the columns 28 and movement of the member 32 in the opposite direction is limited by nuts 36. Springs 40 extend over the columns 28 between the members 30 and 32 to resiliently urge them apart. Two angle brackets 42 are bolted to the member 32 by bolts 44, and provided with a flange 46 adapted to engage the member 30 when the member 32 is moved upwardly by an attached sleeve 48 which is secured to the movable element of a press (not shown).

A flanged collar 50 is disposed in an aperture in the center of the member 30 and a washer 52 is bolted to the member 30 to retain the flange of the collar 50 in position. Tongs 54 are pivotally mounted in the center of the collar 50 by a pin 56 biased to open position by a spring 58. The tongs 54 may be rotated through 360° by rotating the collar 50 to enable it to crimp the boss 22 at any point about its periphery.

A tapered anvil 60 is secured to the underside of the plate 32 by a bolt 62 in aligned relation with the pin 56. The anvil 60 may also be rotated through 360° and be locked in adjusted position by the nut 64. It will be observed that the spring 58 will maintain the upwardly extending arm 66 of the tongs in contact with the tapered sides of the anvil 60 in all positions of the two members 30 and 32. Collars 68 are disposed on the pin 56 on either side of the tongs 54 for locating them in a central position.

Figure 2:
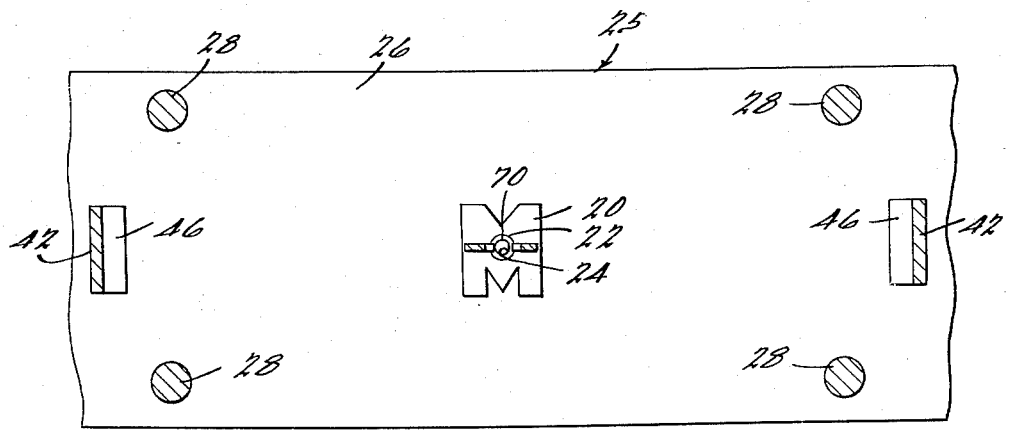
Fig. 2 is a sectional view of the structure illustrated in Fig. 1, taken along the line 2—2 thereof.
Figure 3:
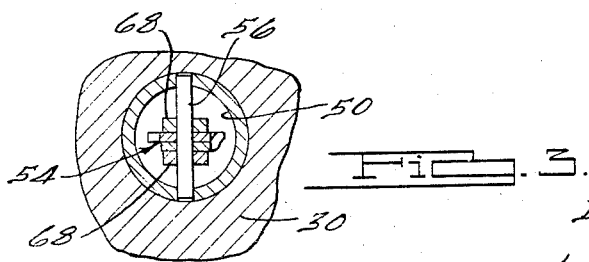
Fig. 3 is a sectional view of the structure illustrated in Fig. 1, taken along the line 3—3 thereof.

In operation, a threaded stud 70 is positioned within the aperture 24 in the boss 22 which is positioned between the jaws 69 of the tongs 54. Downward movement of the sleeve 48 will move both members 30 and 32 downwardly until the plate 30 abuts against the stop collars 34 at which time the tongs will be disposed in position to crimp the boss 22. The springs 40 will permit the continued movement of the member 32 to move the anvil 60 between the arms 66 to force the jaws 69 toward each other to thereby crimp the boss 22. The final position of the jaws is shown in Fig. 2 at which time the boss 22 has been crimped to secure the threaded stud 70 against rotation and withdrawal. Once the crimping is completed, the sleeve 48 moves the member 32 upwardly relative to the member 30 and the spring 58 will force the jaws 69 apart as the anvil 60 releases the arms 66. When the flanges 46 on the plates 42 engage the underside of the member 30, the member 30 will move upwardly along with the member 32 permitting the tongs 54 to clear the workpiece.

Referring to Figs. 5 through 12, several embodiments of the threaded stud are illustrated. In Figs. 5 and 6, the threads of the stud 70 have a plurality of flats 72 formed on the sides at the lower end or along the entire length so that when the jaws 69 crimp the boss 22, portions of the wall of the boss are forced against the flats 72 and into the threads of the stud 70. The crimped material against the flats prevents the stud from rotating in the boss 22 and the crimp material forced into the threads prevents the stud from being withdrawn. It will be observed in Fig. 5 that the flats 72 are formed by removing portions of the thread leaving a substantial amount of the thread and all of the root portions 74. Consequently, sufficient thread remains to secure a nut and to provide a gripping surface for the crimped material. Flats may be provided on the full length of the stud or on both ends of the stud so that it need not be oriented relative to the boss 22, and still permit a nut to be threaded on the free end.

Referring to Figs. 7 and 8, another form of the threaded stud is illustrated that has eight flats extending the entire length of the threaded stud 75 or at one or both ends thereof. The thread root 74 is shown in dotted lines in Fig. 8 and it is clear that sufficient thread is provided to secure a nut in position when threaded thereon. The crimping action of the boss 22 occurs in the same manner as above recited, and the provision of a greater number of flats increases the probability that a flat will be in alignment with the jaws 69 regardless of where the crimping action takes place.

In Figs. 9 and 10, still another modification is shown wherein the threaded stud 77 has a plurality of elongated spiral grooves 76 disposed therein. The material of the crimped walls of the boss 22 will be forced into the grooves 76 to prevent the stud 77 from rotating and the material of the wall within the space between the threads will prevent the stud from pulling out. The grooves 76 follow a spiral path and preferably are perpendicular to the threads of the stud to facilitate a rolling operation of the threads and grooves on the stud simultaneously.

Referring to Figs. 11 and 12, still another form of threaded stud is illustrated wherein flats 79 are provided a spaced distance from one or both ends of the stud 80. The flats 79 are of sufficient depth to remove all of the threads 81 so that the thread roots 74, shown in dotted lines in Fig. 12, lie outside the flats 72. Withdrawal of the threaded stud 70 is, of course, prevented by the crimped material engaging the annular shoulder 78 and the engagement of the flats prevents a turning movement.

What is claimed is:

1. In an article made of readily deformable material containing a boss having an aperture therein for receiving one end of a threaded stud from which portions of the thread have been partially removed, portions of the boss being deformed to extend into the adjacent thread and against the removed portions thereof without deforming the stud, whereby the threaded stud is rigidly secured to the article.

2. In an article made of readily deformable material having an aperture defined by an upstanding wall for receiving one end of a threaded stud containing flat areas adjacent to and spaced from one end thereof, portions of the wall material being deformed to extend into the adjacent thread and against the flat areas without deforming the stud, whereby the threaded stud is rigidly secured to the article.

3. In an article made of readily deformable material having an aperture defined by an upstanding wall for receiving one end of a threaded stud, said threaded stud having spiral grooves transverse to the thread, portions of the wall material being deformed to extend into the adjacent thread and spiral grooves without deforming the stud, whereby the threaded stud is rigidly secured to the article.

References Cited in the file of this patent

UNITED STATES PATENTS

| Number | Name | Date |
|---|---|---|
| 409,696 | Motherwell | Aug. 27, 1889 |
| 676,240 | Latty | June 11, 1901 |
| 1,142,246 | Gagan | June 8, 1915 |
| 1,334,227 | Chelcut | Mar. 16, 1920 |
| 1,393,171 | Schneider | Oct. 11, 1921 |
| 2,232,336 | Meersteiner | Feb. 18, 1941 |
| 2,272,244 | Klein | Feb. 10, 1942 |
| 2,538,343 | Van Winkle | Jan. 16, 1951 |
| 2,562,642 | Saxer | July 31, 1951 |
| 2,562,644 | Saxer | July 31, 1951 |
| 2,596,885 | Booth | May 13, 1952 |
| 2,686,359 | Spencer | Aug. 17, 1954 |